United States Patent [19]

Place, Jr. et al.

[11] Patent Number: 4,545,429

[45] Date of Patent: Oct. 8, 1985

[54] WOVEN CERAMIC COMPOSITE HEAT EXCHANGER

[75] Inventors: Thomas M. Place, Jr., Costa Mesa, Calif.; James A. Crawford, Jr., Kennebunk, Me.

[73] Assignee: Ford Aerospace & Communications Corporation, Detroit, Mich.

[21] Appl. No.: 392,842

[22] Filed: Jun. 28, 1982

[51] Int. Cl.[4] .............................. F28F 3/12
[52] U.S. Cl. .................... 165/169; 165/154; 165/905; 126/442; 126/901
[58] Field of Search .......... 165/164, 185, 154, 169; 428/902, 913, 262, 131; 126/442, 449, 901; 501/95

[56] References Cited

U.S. PATENT DOCUMENTS

| | | | |
|---|---|---|---|
| 2,977,265 | 3/1961 | Forsberg et al. | 428/116 |
| 3,014,872 | 12/1961 | Scott | 165/DIG. 8 |
| 3,112,184 | 11/1963 | Hollenbach | 428/116 |
| 3,251,403 | 5/1966 | Smith | 165/154 |
| 3,335,757 | 8/1967 | Lynch | 165/180 X |
| 3,374,833 | 3/1968 | Bernard | 165/169 X |
| 4,026,746 | 5/1977 | Straw | 165/DIG. 8 X |
| 4,157,929 | 6/1979 | Kubicek | 165/DIG. 8 X |
| 4,167,935 | 9/1979 | Severson | 126/450 |
| 4,213,929 | 7/1980 | Dobson | 165/DIG. 8 X |
| 4,233,107 | 11/1980 | Johnson, Sr. | 126/901 X |
| 4,257,481 | 3/1981 | Dobson | 165/DIG. 8 X |
| 4,384,046 | 5/1983 | Nakagami | 501/95 |
| 4,428,763 | 6/1984 | Layden | 501/95 X |

FOREIGN PATENT DOCUMENTS 23096 2/1982 Japan .................. 126/901

Primary Examiner—William R. Cline
Assistant Examiner—Peggy A. Neils
Attorney, Agent, or Firm—Edward J. Radlo; Robert D. Sanborn

[57] ABSTRACT

Heat exchangers (2) with particular use as solar receivers are mass-produced by weaving on a textile loom a yarn of high modulus fibers (18, 20) into a repeating series of substantially flat preforms (4), forming a set of interconnected passageways (26, 30, 32) connecting one side of each preforms (4) with an opposite side thereof. The separated preform (4) are each wrapped around a mandrel to give each the shape of a cylindrical sleeve (2). The sleeve (2) is impregnated in a low modulus matrix, dried, and sintered for rigidization. In a first sealing embodiment, the outer sleeve surface (24) is sealed or weatherproofed, and the surfaces of the internal passageways (26, 30, 32) are sealed, but the radiation absorbing inner sleeve surface (22) is not sealed. In a second sealing embodiment, the outer surface (24), the radiation absorbing inner surface (22), and the exchanger ends (14, 34) are sealed, but the surfaces of inner passageways (26, 30, 32) are not sealed. The radiation absorbing surface (22) can be stained with a material to heighten solar absorptivity. The exchanger (2) is placed within a weatherproof reflective container (40).

7 Claims, 4 Drawing Figures

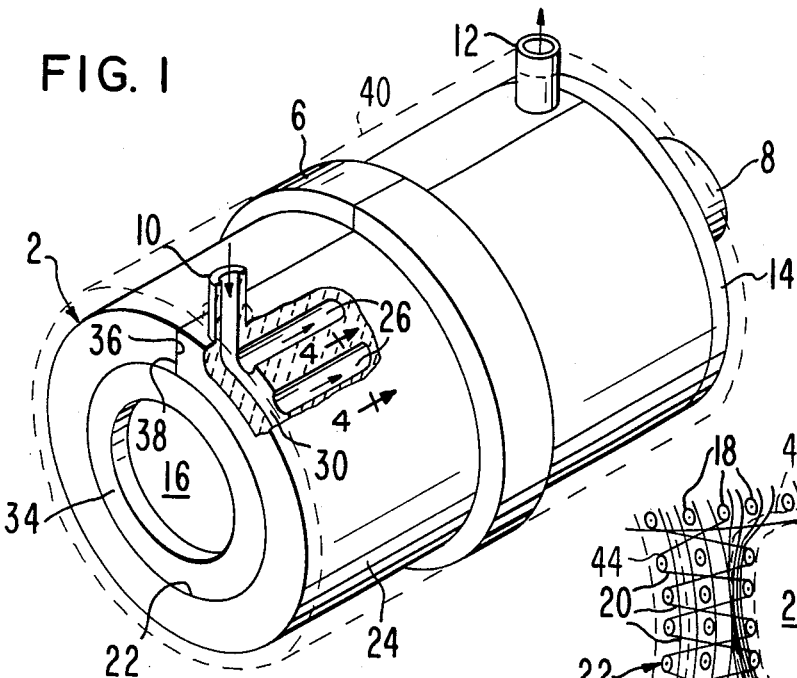
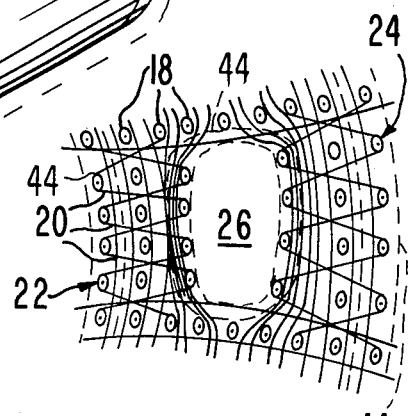
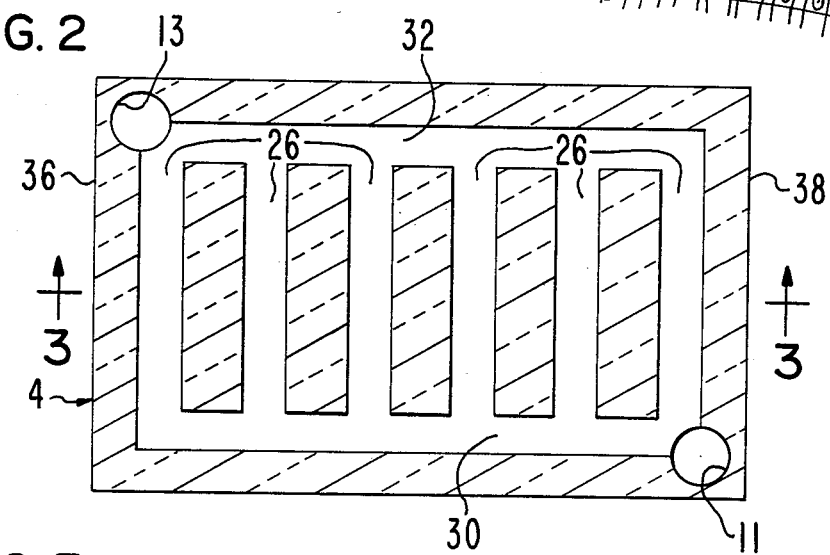
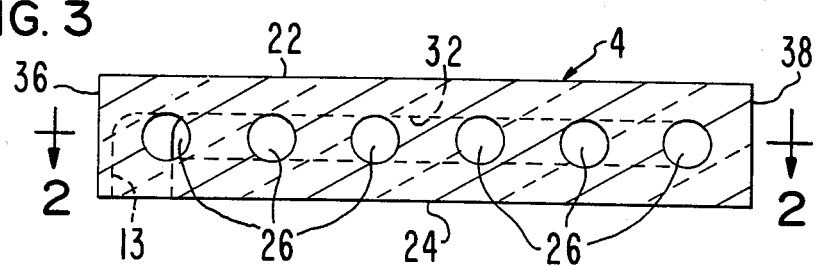

WOVEN CERAMIC COMPOSITE HEAT EXCHANGER

DESCRIPTION

TECHNICAL FIELD

This invention pertains to the field of high temperature fluid (liquid or gas) heat exchangers. Such exchangers can be used in solar receivers (e.g., used in conjunction with Brayton cycle heat engines), catalytic converters for automobiles, etc.

BACKGROUND ART

A prior art search uncovered the following U.S. patent references. In general, ceramic heat exchangers of the prior art have been fabricated of monolithic core structures formed by conventional methods of slip casting, isostatic pressing, cold uniaxial pressing, or extrusion; or made of corrugated paper structures saturated with ceramic slip. The principal disadvantage of these structures is that they are susceptible to catastrophic failure by cracking, particularly during daily exposure to thermal cycling. This is particularly troublesome for a solar receiver, because a solar receiver is designed to have a long life, e.g., 25 years.

U.S. Pat. No. 2,977,265, while not mentioning heat exchangers, discloses a ceramic honeycomb structure. This patent does not show the integral weaving of fluid channels into the structure as in the present invention. It further differs from the present invention in that, although it is a composite, it does not have a microcrack matrix structure.

U.S. Pat. Nos. 3,112,184 and 3,251,403 show ceramic heat exchangers but differ from the present invention in that (1) they are monolithic ceramics, not composites; (2) the fluid channels are not integrally woven into the structure; and (3) the structure is soaked in matrix before the passageways are formed, rather than after.

A secondary reference is U.S. Pat. No. 4,167,935.

In sum, the present invention offers a ceramic heat exchanger which is less expensive, has greater durability, and is less sensitive to fracture and brittleness than those of the prior art.

DISCLOSURE OF INVENTION

The invention is a woven structure in which multiple internal fluid channels (26, 30, 32) have been integrally woven using a yarn (18, 20) into a substantially flat series of usually rectangular preforms (4), e.g., on a programmed automatic textile loom, with repeating elements of a specific design continuously flowing from the loom. Cuts are made between elements to form the individual preforms (4). Each preform (4) is removed from the loom, shaped around a generally cylindrical mandrel, and internally impregnated with a refractory matrix that is compatible with the thermal and physical properties of the fiber (18, 20). The resulting structure (2), now in the shape of a cylindrical sleeve, is then sintered to develop and mature the matrix, thereby rigidizing the structure (2) for use as a heat exchanger. Certain of its surfaces are then sealed with a refractory slip or glaze (44) so that the working fluid within the exchanger (2) is not able to escape.

In a first sealing embodiment, the surfaces of the internal passageways (26, 30, 32) are sealed, but the radiation absorption surface (22) is left unsealed. The outside surface (24) is sealed or at least weatherproofed to contain the solar flux within the confines of the exchanger (2) and to prevent environment disruptions. In a second sealing embodiment, all the exterior surfaces (22, 24, 34, 14) of the heat exchanger (2) are sealed, but the surfaces of the internal channels (26, 30, 32) are not sealed, thus maximizing the surface area of exchanger (2) available for heat transfer with the working fluid.

The instant woven ceramic heat exchanger (2) can be mass-produced inexpensively at a high manufacturing rate on an automatic textile machine. The separate machining and assembly of conventional ceramic parts to generate internal channels (26, 30, 32) is avoided. The fabrication method offers a means for manufacturing a lightweight reinforced composite structure with extraordinary resistance to thermal stress.

Weaving allows considerable latitude for tailoring the number, size, and shape of the internal passageways (26, 30, 32). By selecting the size and color of the yarn (18, 20) and the type of weave, the diffusivity, absorption, and emissivity of the radiation absorbing surface (22) can be optimized.

BRIEF DESCRIPTION OF THE DRAWINGS

These and other more detailed and specific objects and features of the present invention are more fully disclosed in the following specification, reference being had to the accompanying drawings, in which:

FIG. 1 is an elevational view, partially in cross-section, of a cylindrical-sleeve ceramic heat exchanger (2) which has been fabricated according to the teachings of the present invention;

FIG. 2 is a horizontal cross-section of the woven ceramic rectangular preform (4) of the heat exchanger (2) of the present invention prior to rolling into cylindrical shape;

FIG. 3 is an end view of preform (4) (the lower half of which is depicted in FIG. 2), viewed along lines 3—3 of FIG. 2; and FIG. 4 is an enlarged fragmentary schematic view of the region surrounding one of the cross-channels (26) of the heat exchanger (2), viewed along lines 4—4 of FIG. 1.

BEST MODE FOR CARRYING OUT THE INVENTION

The ceramic heat exchanger 2 described herein has the following characteristics: (1) It can withstand very high temperatures. In the case where it is used as a solar thermal receiver for generation of electrical power or industrial process heat, the receiver 2 must withstand temperatures as high as 1370° C. (approximately 2500° F.). (2) It is thermally conductive and absorptive. (3) It can withstand many cycles of temperature change. (4) It has a low thermal coefficient of expansion. (5) Its outside is sealed for protection from the environment, e.g., rain and dust. (6) Its fluid channels are sealed so that the working fluid for the associated heat engine (or other fluid utilizing device) cannot escape.

The material used for heat exchanger 2 is a composite ceramic. As used herein, a "ceramic" is a solid article which has as its essential ingredients inorganic and carbon non-metallic materials. The particular ceramic used herein is a composite consisting of a set of woven high-modulus high-strength fibers 18, 20 embedded in a low-modulus low-strength matrix. The composite is formed so as to have a microcrack structure, i.e., the matrix breaks into small particles as it is dried. As a result, the fibers 18, 20 are free to exhibit their strength without being overly bound by the matrix. The resultant composite ceramic is strong and has reduced notch sensitivity.

The purpose of impregnating the woven fibers with the matrix is to give structural rigidity and integrity to the exchanger 2. The matrix is selected to be refractory and to have a thermal expansion coefficient matched with that of fibers 18, 20. The matrix is preferably a colloidal suspension of materials in the same mass ratio as in the fiber.

The sealing of exchanger 2 is done with the slip 44, i.e., a colloidal suspension of oxide enamel applied in liquid form, which is sintered in a manner to those familiar with the art. The sealant 44 preferably contains the same materials as the matrix. It has to match the thermal expansion coefficients of the fibers 18, 20 and matrix, and be refractory. It is desired that the sealant 44 not penetrate deeply beyond the surface being sealed.

The fibers 18, 20 are woven on a loom, e.g., a Jacquard loom (which was initially designed for weaving textiles). Numerous substantially parallel fibers 18 are interwoven with interlocking fibers 20 (see FIG. 4). The fibers 18, 20 are woven in the loom so as to form a weave comprising a repeating series of preform elements (4) each containing a network of generally cylindrical cross-channels 26 interconnecting a generally cylindrical inlet header 30 with a generally cylindrical outlet header 32. Within inlet header 30 is formed an opening 11 for inlet port 10 and within output header 32 is formed an opening 13 for output port 12. The weave is then severed between each pair of preform elements 4 to separate them.

The placement of the cross-channels 26 is not critical so long as the input port 10 is separated widely from the output port 12 so as to maximize the temperature differential between the two ports. In the case where exchanger 2 is used as a solar receiver, the working fluid enters input port 10, travels through input header 30 and cross-channels 26 where it acquires heat absorbed by surface 22, and travels through output header 32 and output port 12 to a heat engine, where it gives up heat. (The direction of fluid flow is indicated by arrows in FIG. 1).

The cross-channels 26 should be sized so that there is a uniform volumetric rate of fluid flow throughout the entire heat exchanger 2. Thus, those channels 26 under greater pressure should be narrower.

The rectangular preform 4 is removed from the loom and wound around a cylindrical mandrel so that exchanger 2 has a substantially cylindrical-sleeve shape. Headers 30 and 32 are thus positioned circumferentially within the cylindrized exchanger 2, and cross-channels 26 are positioned longitudinally within exchanger 2. Ends 36 and 38 of preform 4 are optionally bonded together. Input port 10 and output port 12 are bonded about openings 11 and 13, respectively, onto outer surface 24 of sleeve 2. In the case where exchanger 2 is a solar receiver, a woven or monolithic mullite backplate 14 (including support boss 8) is bonded onto one end of the receiver 2, normally that associated with output port 12, with an enamel or glaze 44 used to seal the surfaces of the receiver 2. Support flange 6, shown as a circumferential annulus, can be similarly bonded around outer surface 24 of exchanger 2. If it is desired, as in a solar receiver, that the aperture 16 be made smaller than the inner diameter of exchanger 2, a woven or monolithic mullite annular lip 34 is bonded within inner surface 22 of exchanger 2 at that end nearer to input port 10. Alternative to bonding, ports 10 and 12 and flange 6 can be integrally woven as part of preform 4.

Preferably, exchangers 2 are first rigidized and then subsequently sealed by means of the following sequence of steps: weave a repeating series of preforms 4, separate the preforms 4, roll each preform 4 about a cylindrical mandrel, impregnate each resulting sleeve 2 with matrix, dry the exchanger 2, sinter the exchanger 2 to harden the composite, seal the exchanger 2, dry the sealant 44, and sinter the exchanger 2 to harden the sealant 44. Alternatively, the sintering steps can be combined so that the sequence becomes: weave, cut, roll, impregnate, dry, seal, dry, and sinter.

EXAMPLE 1

Fiber 18, 20 is a mullite fiber, i.e., an aluminum silicate crystal structure that is highly refractory, e.g., Nextel 312 TM (a boroaluminum silicate). The matrix is a colloidal suspension of alumina, silica, and boron in substantially the same composition as the mullite fibers. The sealant 44 is a clay-based mullite glaze (a clay/mullite slip).

EXAMPLE 2

For a lower temperature application than in Example 1, fused silica is used for fibers 18, 20. The matrix is silica and the sealant 44 is a low expansion glaze, e.g., spodumene (an aluminum silicate with lithium added).

EXAMPLE 3

The fiber 18, 20 is an E-glass or an S-glass. The matrix is a colloidal combination of the constituents of the glass, and the sealant 44 is a modified glass glaze.

EXAMPLE 4

The fibers 18, 20 are carbon/graphite with oxidation protection. The matrix is graphitized phenolic or pitch or other graphite precursor familiar to those knowledgeable in the art. The sealant is a silicide, silicon carbide, or combinations thereof, including refractory borides and nitrides.

EXAMPLE 5

Other suitable fibers include but are not limited to zircon, zirconia, and alumina ($ZrO_2 \cdot SiO_2$, $ZrO_2$, $Al_2O_3$).

There are two options for selecting the areas to be sealed. In a first sealing embodiment, the surfaces of channels 26, 30, and 32 are sealed from within by means of applying an internal coating of the liquid sealant 44. (Sealant 44 is shown in FIG. 4 only, to avoid cluttering the other drawings.) In this embodiment, the outer surface 24 of the exchanger 2 is sealed or at least weatherproofed (to prevent convection losses of solar flux in the case where it is a solar receiver, and to prevent disruption by environmental contaminants), but the inner surface 22 is not sealed.

In a second sealing embodiment, all exterior surfaces of exchanger 2 are sealed, i.e., heat absorbing surface 22, outer surface 24, both sides of end plate 14, and both sides of lip 34; but the surfaces of channels 26, 30, and 32 are not sealed. This embodiment permits a greater surface area within exchanger 2 into which the working fluid can transfer heat, since essentially all of the inner volume of exchanger 2 is so used.

It is normally desired to make channels 26, 30, and 32 as large as possible for the following reasons: (1) to maximize the heat transfer surface areas; (2) to minimize the gradient between the radiation absorbing surface 22 and the surfaces of channels 26, 30, and 32; and (3) to make it easier to seal the surfaces of the channels (in the case of the first sealing embodiment). On the other hand, one cannot make the channels 26, 30, 32 so large that the structural integrity of exchanger 2 will be jeopardized.

To maximize solar absorptivity, the radiation absorbing surface 22 can be coated with a ceramic strain which optimizes for absorptivity in the ultraviolet region, where most solar radiation is situated. For example, a black stain can be achieved by placing a mixture of oxides of manganese and chrome into the sealant 44 during the sealing step; the stain then creates a black surface during the sintering step. (This technique can be used in the second sealing embodiment.) Another method for increasing solar absorptivity is to increase the ratio of the surface area of the radiation absorbing surface 22 to the area of aperture 16, e.g., by providing lip 34 as described above. This in effect creates a more efficient black body for optimizing absorptivity.

The solar receiver heat exchanger 2 can be placed inside a metallized reflective container 40 to minimize heat loss from outer surface 24 and to protect receiver 2 from the ravages of adverse weather.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A heat exchanger comprising:
   a solid portion surrounding a void portion; wherein the solid portion comprises a single woven fabric of interconnected fibers; and
   the void portion comprises a network of interconnected generally cylindrical openings having diameters much greater than the separation between fibers in the fabric, the surfaces of the openings being integrally woven as part of the single woven fabric of interconnected fibers;
   wherein the network is coupled to regions extrinsic to the exchanger via an input port penetrating one end of the exchanger, and via an output port penetrating an opposite end of the exchanger; and
   the network is disposed to permit a heat transfer fluid to travel through the input port into the exchanger, thence to travel out the output port out of the exchanger, and wherein the solid portion of the exchanger is fabricated of a ceramic composite material consisting of a single woven fabric of interconnected fibers impregnated with a matrix.

2. The heat exchanger of claim 1 wherein:
   the fabric is a mullite;
   the matrix is a colloidal suspension of alumina, silica, and boron in substantially the same ratio as in the fabric; and
   the exchanger is sealed with a clay-based mullite glaze.

3. The heat exchanger of claim 1 wherein the fabric is fused silica, the matrix is silica, and the exchanger is sealed with a low expansion glaze.

4. The heat exchanger of claim 1 wherein the exchanger is generally in the shape of a cylindrical sleeve;
   the input port connects regions extrinsic to the exchanger with an integrally woven input header opening portion of the network, said input header opening disposed circumferentially within the sleeve at a first end thereof;
   the output port connects regions extrinsic to the exchanger with an integrally woven output header opening portion of the network, said output header opening disposed circumferentially within the sleeve at a second end thereof opposite the first end; and
   several cross-channel openings are integrally woven into the sleeve, each cross-channel opening connecting the input header opening with the output header opening;
   wherein
   the heat transfer fluid acquires a first temperature as it travels through the network, then exits the exchanger where it acquires a second temperature different from the first temperature, then re-enters the exchanger.

5. The heat exchanger of claim 4 wherein the outer cylindrical surface of the sleeve is weatherproofed, the surfaces of the cross-channel openings and header openings are sealed to inhibit the flow of said fluid therethrough, and the inner cylindrical surface of the sleeve is not sealed.

6. The heat exchanger of claim 4 wherein the outer cylindrical surface of the sleeve is sealed to inhibit the flow of said fluid therethrough, the inner cylindrical surface of the sleeve is sealed, and the surfaces of the cross-channel openings and header openings are not sealed.

7. The heat exchanger of claim 6 wherein the sleeve is positioned to accept solar radiation; the inner sleeve surface is stained with manganese and chrome to heighten ultraviolet absorptivity; and the sleeve is placed inside a metallic container.

* * * * *